United States Patent
Moskal

(10) Patent No.: US 6,666,024 B1
(45) Date of Patent: Dec. 23, 2003

(54) METHOD AND APPARATUS FOR GENERATING ENERGY USING PRESSURE FROM A LARGE MASS

(76) Inventor: Daniel Moskal, 4891 N. Hermitage Ave., Chicago, IL (US) 60640

( * ) Notice: Subject to any disclaimer, the term of this patent is extended or adjusted under 35 U.S.C. 154(b) by 0 days.

(21) Appl. No.: 10/251,595

(22) Filed: Sep. 20, 2002

(51) Int. Cl.[7] .............................. F03G 7/05; F03G 7/04; F03G 7/06
(52) U.S. Cl. ................. 60/641.7; 60/325; 60/412; 60/516; 60/650; 415/916
(58) Field of Search .................. 60/641.7, 516, 60/325, 412, 650; 415/916

(56) References Cited

U.S. PATENT DOCUMENTS

| | | | |
|---|---|---|---|
| 3,994,134 A | 11/1976 | Molnar | 60/496 |
| 4,170,878 A * | 10/1979 | Jahnig | 60/641.7 |
| 4,311,012 A * | 1/1982 | Finley | 60/641.7 |
| 4,619,593 A | 10/1986 | Molnar | 417/498 |
| 5,366,635 A | 11/1994 | Watkins | 210/651 |
| 5,513,494 A * | 5/1996 | Flynn et al. | 60/641.7 |
| 5,916,441 A | 6/1999 | Raether | 210/257.2 |
| 6,348,148 B1 | 2/2002 | Bosley | 210/170 |

* cited by examiner

Primary Examiner—Sheldon J. Richter
(74) Attorney, Agent, or Firm—Jenner & Block

(57) ABSTRACT

A fluid, for example, air, is subjected to a high pressure while in a high pressure inducing vessel (101). The high pressure is due to a large mass, such as the ocean. The fluid is then cooled and directed into a depressurized vessel (107), such as a pressure hull, which is at a relatively lower pressure. With this change in pressure, the fluid expands. This expansion is used to generate work/energy using a work producing machine (108), for example, a turbine. Energy from the work producing machine is converted to electricity using a generator (111). The fluid is collected from the work producing machine and again subjected to the high pressure and low pressure to generate additional electricity.

19 Claims, 3 Drawing Sheets

METHOD AND APPARATUS FOR GENERATING ENERGY USING PRESSURE FROM A LARGE MASS

FIELD OF THE INVENTION

The invention generally relates to generating energy, such as electricity, and in particular, to using natural pressure from a large mass, such as the ocean, to generate electricity.

BACKGROUND OF THE INVENTION

The desire to develop new methods of generating electricity has been a driving force throughout recent human history. There are two main methods of generating electricity each with its own challenges: one uses fuel as the energy source and the other utilizes natural phenomena as the energy source. Fuel-based energy generation has problems with the cost of the fuel as well as the polluting byproducts of fuel consumption. Exemplary fuels used as the energy source for energy generation include coal, natural gas, nuclear fuel, and the like. The challenges associated with using natural phenomena as the energy source vary with the technology used. Solar and wind forces do not produce energy in a predictable amount and the energy is often generated during off-peak consumer demand. Hydroelectric power provides a source of energy that can be harvested when needed, but the damming of bodies of water causes significant environmental harm. Other natural phenomena used to produce energy, for example, ocean waves, ocean thermal and buoyancy, are expensive to build and maintain relative to the amount of energy they produce.

There are a few inventors who have utilized the potential energy from the gravitational force from deep sea water to create pressure differentials between deep water and a low pressure vessel to produce useful work or energy. Several use a pressure differential to force saltwater through a reverse osmosis device and produce fresh water. U.S. Pat. No. 6,348,148 to Bosley, U.S. Pat. No. 5,916,441 to Raether and U.S. Pat. No. 5,366,635 to Watkins are examples. These inventions make no attempt to produce electricity and do not utilize a closed cycle.

U.S. Pat. Nos. 3,994,134 and 4,619,593 both to Molnar claim to use man-made pressure differential in the deep sea to create electricity. In these patents pressurized seawater is allowed into a depressurized chamber via a water inlet whereby the natural flow of water from the higher to lower pressure effects the drive of a turbine. The turbine drives an electric generator to produce electricity. Then water is returned to the sea in a manner that is claimed to consume less energy than is produced. The main problems with this invention are: (1) the energy needed to return low pressure water into a high water pressure environment; (2) the turbine buckets, water inlets and water outlets are exposed to corrosive sea water; and (3) the difficulty of maintaining the flow of a large enough volume of water to produce a significant amount of energy.

In spite of the improvements disclosed in the prior art there is no practical method and apparatus to translate the potential energy created by the gravitational force of a large mass of liquid or solid into kinetic energy and in turn utilize that kinetic energy to safely and efficiently generate electricity. The use of gravitational force of a mass of liquid or solid to induce pressure on a closed cycle of a fluid as described herein for the present invention is unprecedented.

SUMMARY OF THE INVENTION

One potential source of energy production that has been largely overlooked is force from the pressure exerted by a large mass of liquid or solid, for example, the ocean. The potential energy from the gravitational force from the weight of a mass of liquid or solid is constant and in equilibrium unless this state is upset by nature or man-made apparatus. This force can be converted from potential energy, to kinetic energy and then to electrical energy and/or work by creating a pressure differential and utilizing the well known ideal gas laws. A substantial advance is made in the art to overcome problems of the prior art by an apparatus and method operating on this principle. This apparatus provides a way to produce unlimited amounts of energy efficiently and with minimal pollution. The invention establishes a new method and technology for the production of electricity and/or work.

According to the invention, a fluid travels through a closed cycle/system, which includes a depressurized vessel and a vessel that communicates with a high pressure caused by a large mass of liquid or solid. This creates a pressure differential within the cycle/system and causes the fluid to continually contract and expand, due to the changes in pressure. When the fluid transitions to the expansion phase, a work producing machine converts the expansion of the fluid into useful work and/or energy.

DESCRIPTION OF THE PREFERRED EMBODIMENTS

Figure 1:
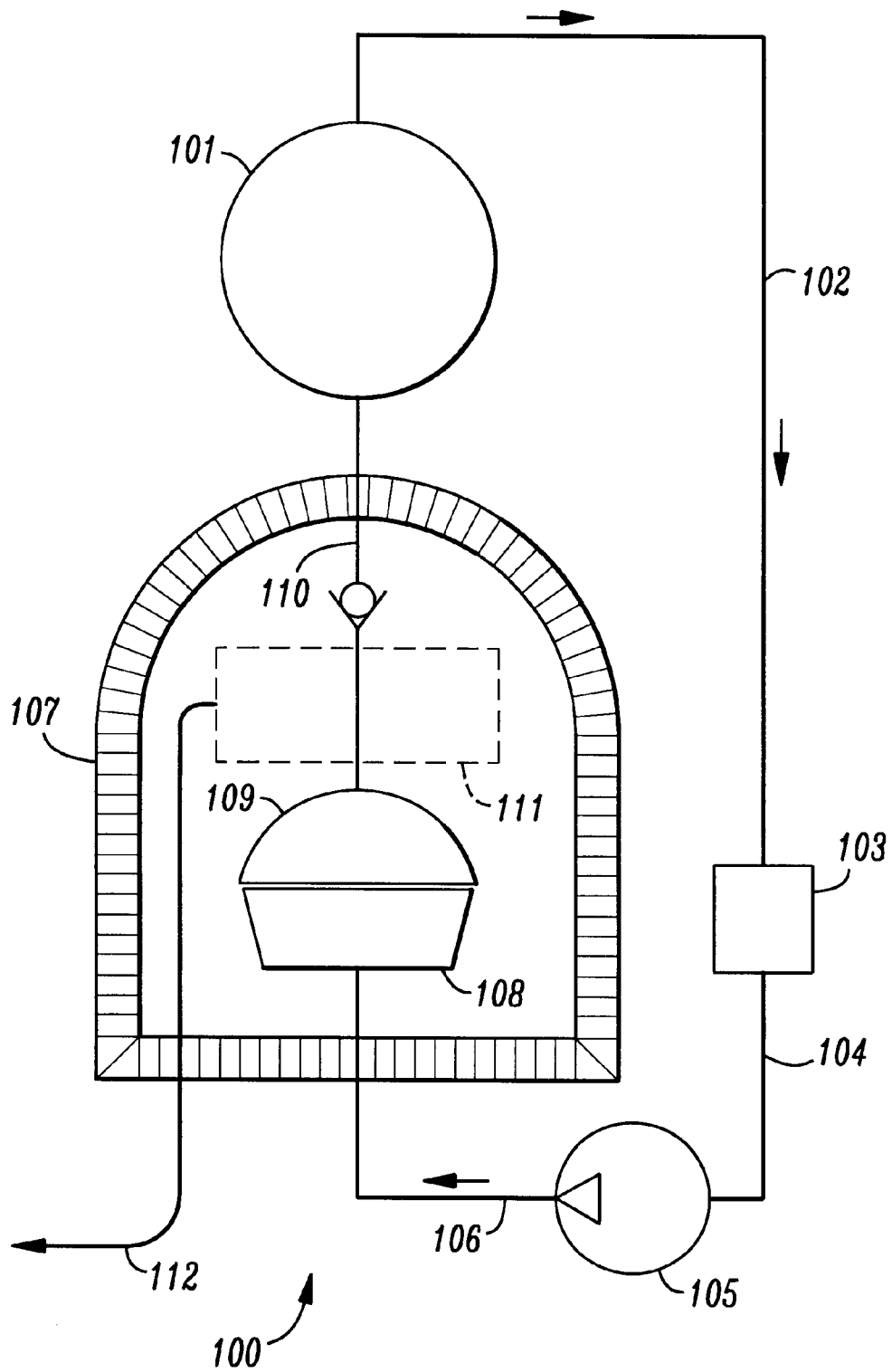
FIG. 1 is a schematic view of an apparatus that generates electricity in accordance with the invention.

FIG. 1 shows an apparatus 100 that generates electricity in accordance with the invention. Apparatus 100 includes a high pressure inducing vessel 101 made from an flexible material that communicates with a high pressure mass outside the high pressure inducing vessel 101. A pipe 102 leads from the high pressure inducing vessel 101 to a cooling unit 103. Cooling unit 103 is connected to a pump 105 by pipe 104. Another pipe 106 connects pump 105 to a work producing machine 108, which is contained inside a depressurized vessel 107. Depressurized vessel 107 is preferably a pressure hull. The atmospheric pressure inside the depressurized vessel 107 is controllable and chosen so that the compression ratio between the depressurized vessel 107 and the high pressure inducing vessel 101 creates a compression ratio that is ideal for the work producing machine 108.

Work producing machine 108 uses expansion of a fluid to produce useful work. Preferably, work producing machine 108 is a gas or steam turbine. Alternatively, work producing machine 108 is a wind turbine, Tesla turbine, piston and camshaft design, hydroelectric turbine, water wheel or any other machine that converts a fluid into useful work.

A fluid collector 109 collects fluid from the work producing machine 108 so that the fluid doesn't leak into depressurized vessel 107. This prevents any change of the atmospheric pressure inside depressurized vessel 107 so that the compression ratio is not effected.

A one-way fluid pipe 110 allows the fluid to go up to the high pressure inducing vessel 101 but does not allow it to travel in the opposite direction. Preferably one or more one way fluid valves control the one way flow.

A generator 111 is coupled to work producing machine 108 and converts rotational energy from the work producing machine 108 into electricity. A cable 112 brings the electricity from apparatus 100 to the electricity consumer via a power grid or the like.

High pressure inducing vessel 101 is preferably made from elastic, insulated, durable material. This material preferably conforms to a certain shape, like rubber, or may be more bag like, similar to hot air balloon. Most preferably high pressure inducing vessel 101 is multilayered, for example, a powdered ceramic insulator bonded to a fabric base and sandwiched between two layers of insulating, elastic material, such as rubber. Alternatively, high pressure inducing vessel 101 is made from KEVLAR, NOMEX, TEFLON. In other alternative embodiments, high pressure inducing vessel 101 includes a large piston with the weight compressing the fluid in the cylinder.

Pipes 102, 104 are preferably PVC, rubber, steel, copper or any material that can handle seawater corrosion. Pipes 102, 104 may be covered in a layer of material that prevents corrosion and insulates. Pipe 106 interfaces the high and low pressure parts of the system/cycle so it preferably is made from stronger material than pipes 102, 104. The use of special alloys and or thicker pipe walls provides the extra strength needed.

There are two preferred methods to cool the gas using cooling unit 103. One method includes passing the hot fluid through tubes in thermal communication with cold seawater. The other method includes using some of the electricity from generator 111 to run a cooling apparatus utilizing fluorocarbons. Cooling unit 103 preferably has a thermometer to measure the gas temperature and can cool the fluid to a predetermined suitable temperature for the work producing machine 108. The cooling unit 103 may be avoided if the high pressure inducing vessel and other parts in contact with the water permit enough heat leakage that the temperature of the fluid entering work producing machine 108 is ideal. Where cooling unit 103 is avoided, pipe 102 and pipe 104 are replaced with a single pipe.

Pump 105 is preferably an air or water pump, depending on the physical state of the fluid. Pump 105 is subject to high pressures, and hence, is preferably durable. Most preferably, pump 105 needs minimal or no maintenance. Pump 105 may be eliminated where a vacuum created by the expansion of the fluid inside the depressurized vessel 107 is sufficient to pull the fluid into depressurized vessel 107. Pipe 104 and pipe 106 are replaced with a single pipe where pump 105 is eliminated. In the case where the pump 105 and cooling unit 103 are both eliminated, pipe 102, 104, and 106 are replaces with a single pipe.

Depressurized vessel 107 is preferably a pressure hull, such as those used for submarines and the like, made from high yield steel. Other alloys may be employed. The depressurized vessel 107 may have a V shaped wedge, a spherical shape or any shape that can withstand the high pressure water while allowing the interior of the vessel to stay at relatively low pressure. Depressurized vessel 107 is alternatively made of thick concrete, dug into the sea floor rock.

Work producing machine 108 is preferably any machine that can turn expanding fluid into rotational energy including, Tesla bladeless turbines, gas turbines, steam turbine, waterwheels, windmills, hydroelectric turbines, piston and camshaft combinations and the like.

The preferred fluid collector 109 depends on the type of work producing machine 108 and fluid chosen. Fluid collector 109 may be a rigid form coupled to the exhaust of the work producing machine 108. Alternatively, fluid collector 109 may be a bag-like membrane encompassing any area where fluid exits work producing machine 108. Any means for collecting gas or liquid may be adapted to serve as fluid collector 109. Fluid collector 109 is preferably made from a wide variety of durable materials such as plastic, rubber or metal.

One-way fluid pipe 110 is preferably made of materials used for pipe 106. Pipe 110 has a one-way valve. This is preferably a fluid valve but is alternatively air bubbling up into a liquid so that due to a buoyancy effect, the air is permitted to only go up.

Generator 111 preferably does not require significant routine maintenance. The heat loss from the generator 111 is directed into the high pressure inducing vessel. Cable 112, which is coupled to generator 111 is preferably any insulated wire(s) that has enough capacity to deliver the electricity to the power grid.

In operation, the pressure outside the high pressure inducing vessel 101 from the potential energy of the deep seawater is transferred to a fluid inside vessel 101, reducing the volume of the fluid and increasing the fluid's temperature. The fluid is preferably a gas but may be a liquid or a medium that changes states between gas and liquid under the influence of pressure and/or temperature. The pressure inducing vessel 101 is insulated and large enough in volume to allow drawing off or removal of the amount of fluid that is ideal for the type of work producing machine chosen.

Cooling unit 103 receives the fluid from high pressure inducing vessel 101 via pipe 102. Cooling unit 103 cools the fluid to the ideal temperature for the chosen work producing machine 108. Pump 105 receives the fluid after it is cooled from cooling unit 103 via pipe 104. Pump 105 supplies the fluid to work producing machine 108 via pipe 106. Preferably, pump 105 has enough capacity to provide an ideal amount of fluid to the work producing machine 108.

Work producing machine 108 uses expansion of the fluid to produce useful work using well-know principles associated with gas and steam turbines, wind turbines, Tesla turbines, hydroelectric turbines, and the like. Generator 111 converts rotational energy from work producing machine 108 into electricity that is delivered via cable 112.

Fluid collector 109 collects fluid exiting the work producing machine 108 so that the fluid does not leak into depressurized vessel 107. This prevents any change of the atmospheric pressure inside depressurized vessel 107 so that the compression ratio is not effected. To complete one full cycle, the fluid is returned to the high pressure inducing vessel 101 via one-way fluid pipe 110. The cycle is continuously repeated with fluid traveling through the system changing pressure and producing energy.

One example operation of a preferred embodiment is described below using an ideal Brayton cycle and a typical gas turbine as the work producing machine 108. Apparatus 100 is lowered into position under the ocean. Compressed air tanks are also lowered with apparatus 100. Apparatus 100 is filled with gas from the compressed air tanks. The volume of gas needed for the closed cycle is determined in part by the gas flow for the chosen gas turbine and maintenance of the ideal compression ratio of 14.7 to 1. For General Electric turbines the range of air flow is 46 to 124 kg/sec.

The gas is heated to the ideal air exit temperature for the gas turbine. For an ideal Brayton cycle the ideal air temperature is 593 degrees Celsius. The heating may be achieved by using fuel-based heaters or by running the gas through the closed cycle of apparatus 100 until there is enough heat from friction created. This preferably places the gas at one atmosphere of pressure in depressurized vessel 107.

The gas then passes through the one-way fluid pipe 110 to the high pressure inducing vessel 101 that communicates with the high pressure environment surrounding the vessel. The gas is then exposed to the pressure inside the vessel 101 which is now 14.7 times greater than that of the gas inside the depressurized vessel 107. Also the temperature of the gas inside vessel 101 increases to about 1288 degrees. The temperature is likely somewhat higher than 1288 degrees Celsius because of the contribution of heat from the generator and friction elsewhere in apparatus 100.

The compressed, heated gas travels from the high pressure inducing vessel 101 to the depressurized vessel 107 because of the suction force from pump 105 or the suction force from a vacuum caused by the expanding gas in depressurized vessel 107. While traveling between the two vessels the gas may pass through a cooling unit 103 so that the inlet temperature is the ideal 1288 degrees Celsius called for by the Brayton cycle.

The gas at 1288 degrees Celsius and compressed to 14.7 times the pressure of the gas inside the one way fluid pipe 110 enters into the depressurized vessel 107 by means of pipe 106 and enters the work producing machine 108, which is a gas turbine. The gas expands by a factor of 14.7, drops in temperature to 593 degrees Celsius and is now back to a pressure 1/14.7 of what it was before it entered the gas turbine. In practice the temperature is likely higher because of the heat due to heat loss in generator 111 and pump 105. Cooling unit 103 preferably keeps the temperature at ideal levels or materials may be chosen for high pressure inducing vessel 101 and pipes 102, 104 and 106 so that precisely the correct amount of heat is transferred to the surrounding seawater, thereby maintaining ideal temperature levels.

The gas turbine harvests the expanding gas and converts it to mechanical energy, which is in turn converted to electrical energy by the generator 11. The electricity is then brought to the consumer by cable 112.

The gas exhaust from the gas turbine is collected by the fluid collector 109. The gas then passes through the one way fluid pipe 110 into the high pressure inducing vessel 101 where the gas is compressed and heated and the cycle begins anew.

Figure 2:
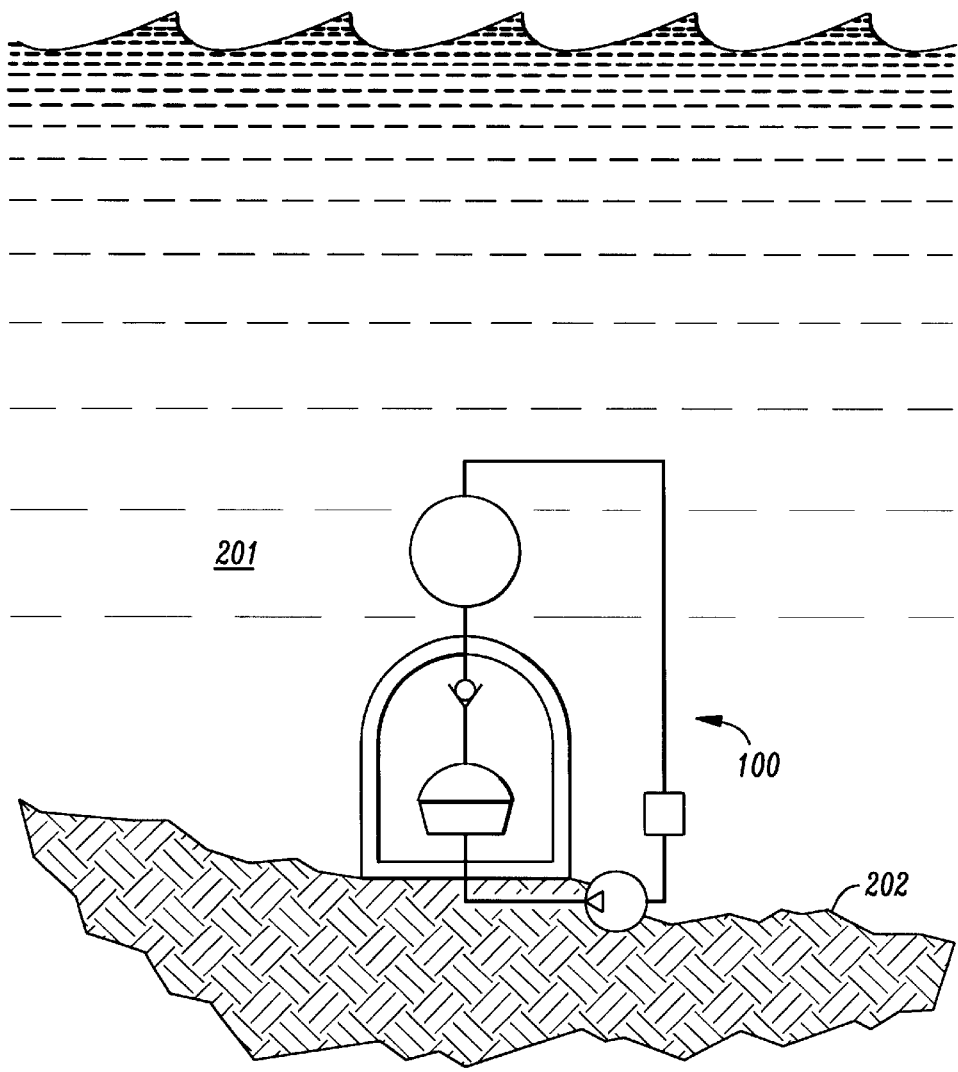
FIG. 2 is a schematic plan view of the apparatus of FIG. 1 in an environment where the apparatus is exposed to pressure from a large mass.

FIG. 2 is a schematic plan view showing apparatus 100 in an environment where a large mass of liquid from the ocean is in contact with the apparatus. More specifically, apparatus 100 is secured to, or mounted on the sea floor 202. Seawater 201 surrounds apparatus 100. Apparatus 100 is placed at a depth where a suitable high pressure from the seawater mass is applied to apparatus 100. As an alternative to seawater, sand, dirt, gravel, or the like may be applied to apparatus 100 while apparatus 100 is in a hole, pit or the like.

Figure 3:
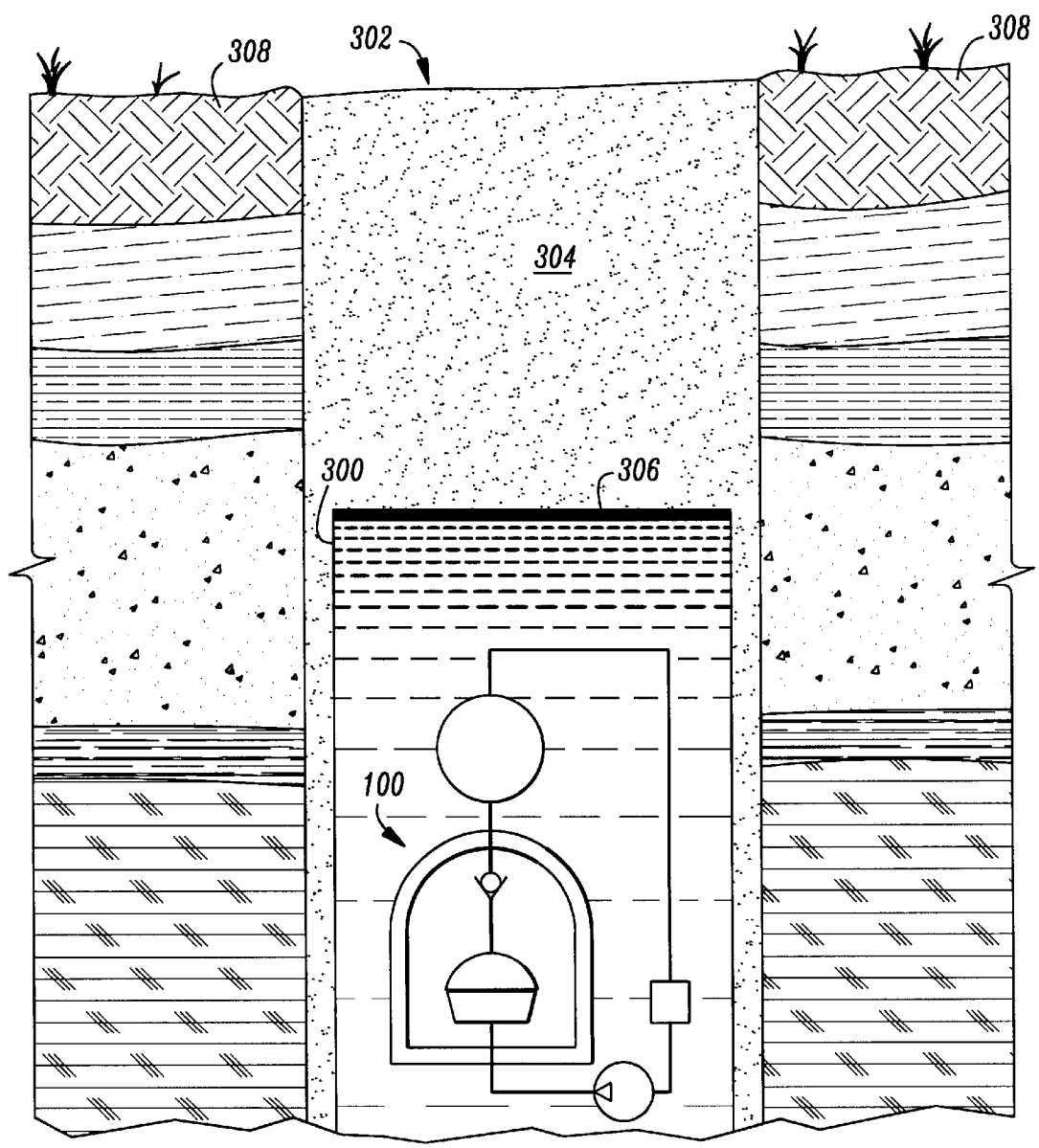
FIG. 3 is a schematic plan view of the apparatus of FIG. 1 in another environment where the apparatus is exposed to pressure from a large mass.

FIG. 3 is a schematic plan view showing apparatus 100 in another environment where a large mass of loose soil 304, which is in a large, deep pit 302 dug into the ground 308, is in contact with a tank 300. Tank 300 completely encloses apparatus 100. Preferably, tank 300 is filled with water or the like. Most preferably, tank 300 has a top or lid 306 that maintains the seal on tank 300, but is pliant enough to transfer the pressure from the mass of soil 304 to apparatus 100. One preferred material for lid 306 is hard rubber. Notably, pit 302 is deep into the earth and filled with loose soil 304 to cause the pressure transfer.

The above-described embodiments of the invention are provided purely for purposes of example. Many other variations, modifications, and applications of the invention may be made.

What is claimed is:

1. A method for producing electricity, the method, comprising the steps of:
   a) subjecting a fluid to a first pressure;
   b) pumping the fluid into a vessel with a second pressure to cause expansion of the fluid, wherein the first pressure is higher than the second pressure;
   c) directing the fluid through a machine that generates energy in response to the expansion of the fluid;
   d) converting energy from the machine to electricity; and
   e) repeating steps a through d using the fluid.

2. The method of claim 1 wherein the step of pumping the fluid includes cooling the fluid to a temperature suitable for entry into the machine.

3. A method for producing electricity, the method, comprising the steps of:
   positioning an apparatus under a large mass of liquid or solid;
   filling the apparatus with a predetermined volume of a fluid;
   transporting the fluid through a high pressure inducing vessel that communicates with a high pressure environment surrounding the high pressure inducing vessel to transfer a high pressure to the fluid inside the high pressure inducing vessel;
   transporting the fluid from the high pressure inducing vessel to a depressurized vessel, whereby the fluid expands in response to a change in pressure, the depressurized vessel having a pressure that is lower than the high pressure;
   converting a force from expansion of the fluid into work by a work producing machine; and
   generating electricity using work from the work producing machine.

4. The method of claim 3 wherein the large mass of the liquid or solid is one of: water, soil and sand.

5. The method of claim 3 further comprising the step of collecting the fluid after it exits the work producing machine to maintain a closed cycle.

6. The method of claim 5 further comprising the step of, after collecting the fluid, transporting the fluid to the high pressure inducing vessel.

7. The method of claim 6 wherein the fluid comprises a gas or liquid.

8. The method of claim 6 wherein the fluid comprises air.

9. The method of claim 6 wherein the high pressure inducing vessel comprises insulated durable material.

10. The method of claim 6 wherein the pressure inducing vessel is multilayered.

11. The method of claim 6 wherein the pressure inducing vessel comprises a ceramic insulator.

12. The method of claim 6 wherein the work producing machine comprises one of a gas turbine, a steam turbine, a wind turbine, a Tesla turbine, a piston and camshaft, a hydroelectric turbine, and a water wheel.

13. An apparatus adapted to exploit potential energy from the gravitational force of a large mass to produce electricity, comprising:
   a high pressure inducing vessel that facilitates the transfer of a high pressure environment outside the high pressure inducing vessel to a fluid inside the high pressure inducing vessel, thereby reducing the volume of the fluid;
   a depressurized vessel coupled to receive the fluid from the high pressure inducing vessel, whereby the fluid expands due to a change in pressure;

a work producing machine that converts a force from expansion of the fluid into rotational energy; and a generator that converts rotational energy from the work producing machine into electricity.

14. The apparatus of claim 13 further comprising a fluid collector that captures the fluid as it exits the work producing machine and directs the fluid to the high pressure inducing vessel, thereby completing a closed cycle.

15. The apparatus of claim 14 further comprising a cooling unit coupled to receive the fluid from the high pressure inducing vessel and to provide the fluid to the depressurized vessel.

16. The apparatus of claim 14 further comprising a pump coupled to receive the fluid from the high pressure inducing vessel and to provide the fluid to the depressurized vessel.

17. The apparatus of claim 14 wherein the work producing machine comprises one of a gas turbine, a steam turbine, a wind turbine, a Tesla turbine, a piston and camshaft, a hydroelectric turbine, and a water wheel.

18. The apparatus of claim 14 wherein the fluid comprises a gas or liquid.

19. The apparatus of claim 14 wherein the depressurized vessel comprises a pressure hull.

* * * * *